Dec. 5, 1933.   K. E. PEILER   1,937,913
MANUFACTURE OF GLASSWARE
Filed March 8, 1929   3 Sheets-Sheet 1
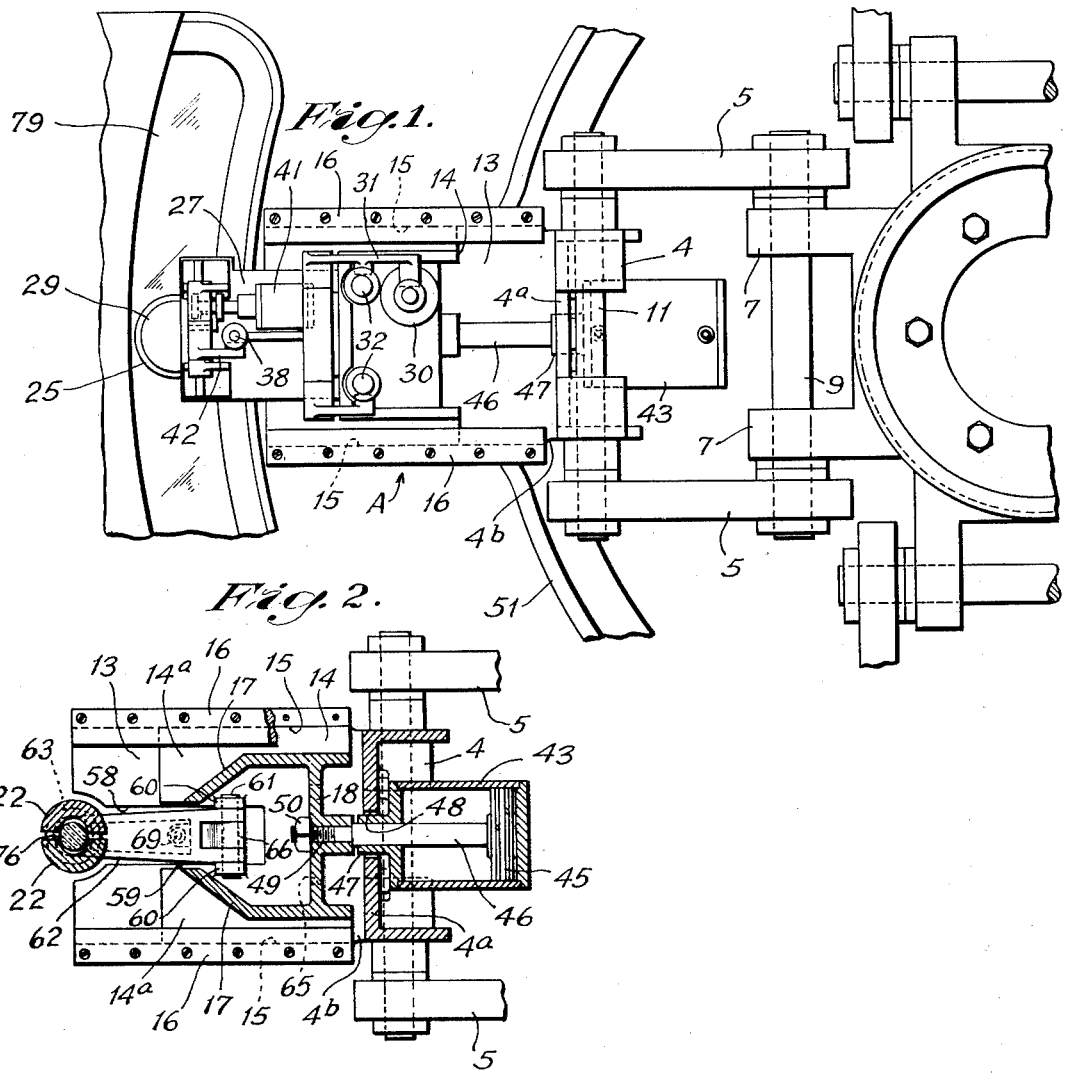

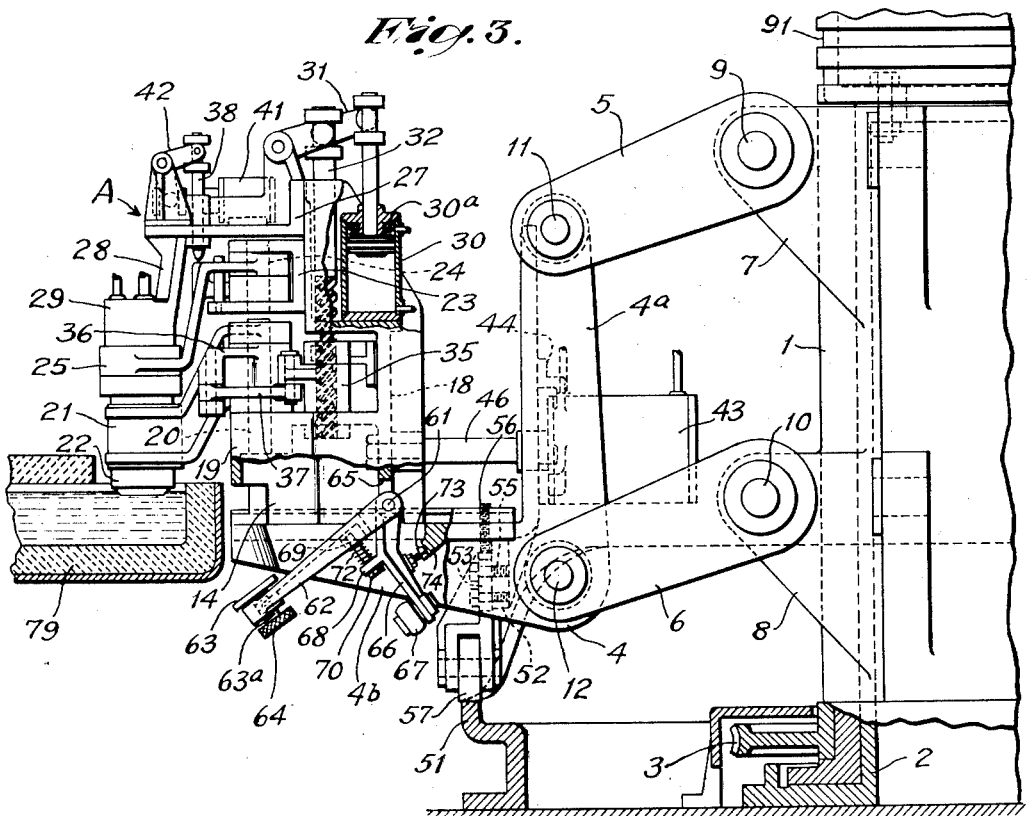
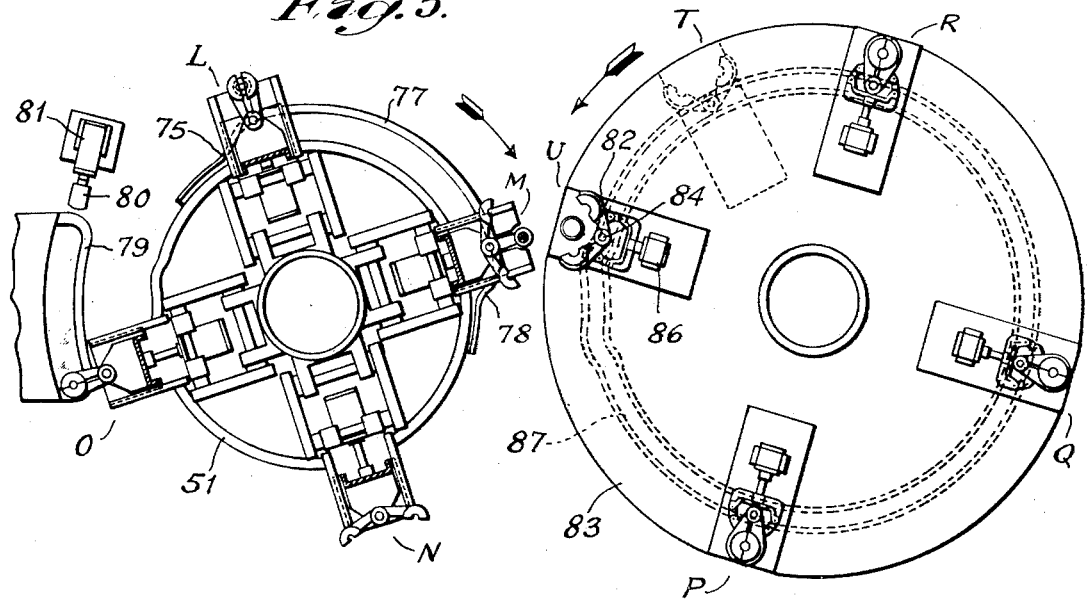

Dec. 5, 1933.     K. E. PEILER     1,937,913
MANUFACTURE OF GLASSWARE
Filed March 8, 1929     3 Sheets-Sheet 3
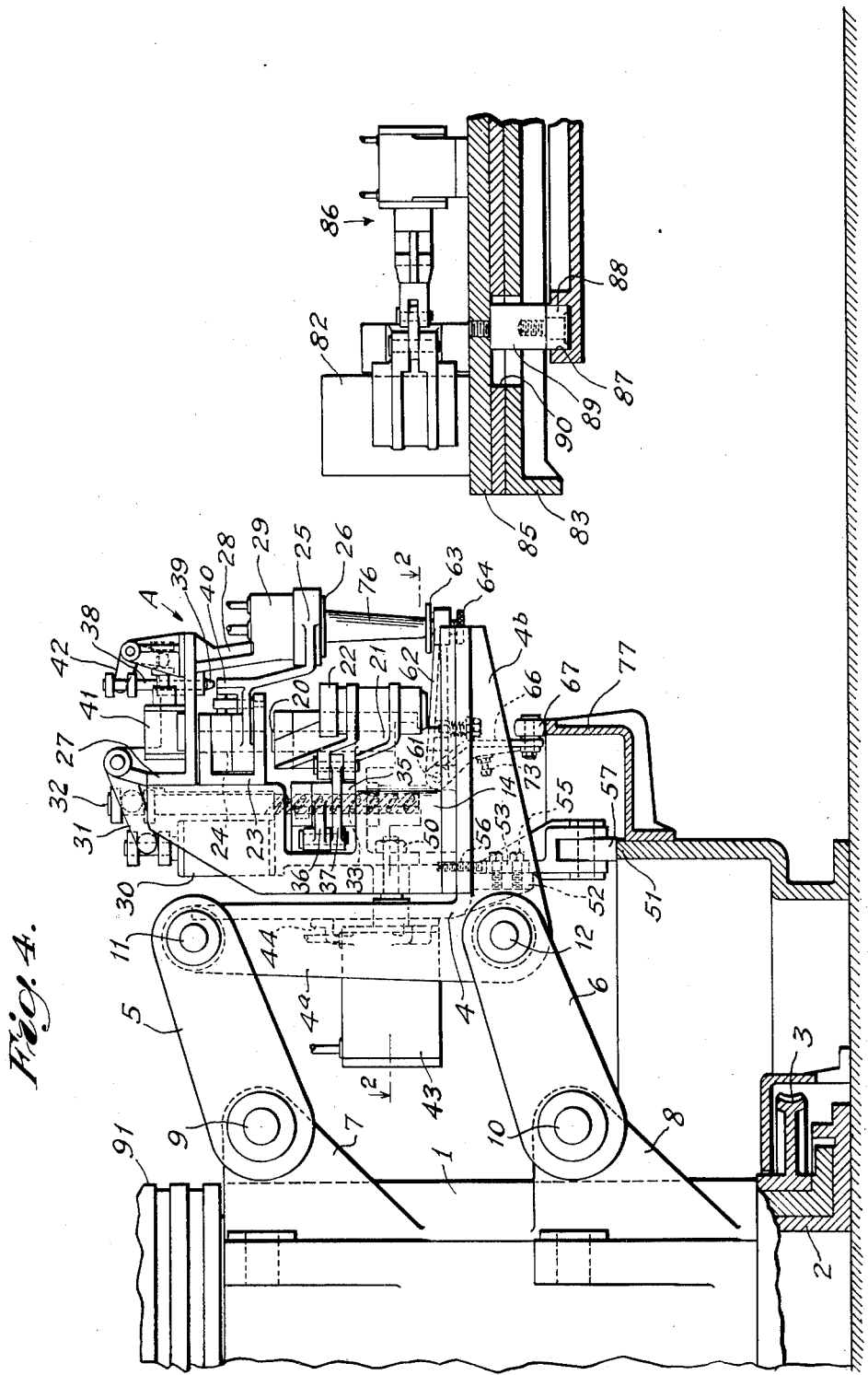
Witness;
W. B. Thayer
A. A. Horn
Inventor;
Karl E. Peiler,
by Brown+Carlaw
Attorneys Patented Dec. 5, 1933

1,937,913

UNITED STATES PATENT OFFICE 1,937,913

MANUFACTURE OF GLASSWARE

Karl E. Peiler, West Hartford, Conn., assignor to Hartford-Empire Company, Hartford, Conn., a corporation of Delaware Application March 8, 1929. Serial No. 345,536

12 Claims. (Cl. 49—5)

My invention relates to the manufacture of glassware and more particularly to glass working machinery of the type that includes mechanism for receiving and forming charges of molten glass into parisons and for subsequently transferring the parisons to finishing molds for the completion of the formation of the articles.

It is usual, in glass working apparatus of the type above mentioned, to provide a rotary table or carrier on which a plurality of glass gathering and parison forming units are disposed, each of which may comprise cooperative two-part parison body and parison neck molds, respectively adapted to be opened and closed. Each of such glass gathering and parison forming units is caused to dip to the surface of a pool of molten glass during each cycle of rotation of the carrier and suction ordinarily is employed to draw a charge of glass up into the glass gathering unit while the molds of such unit are closed, the lower end of the glass receiving cavity thereof being open. The glass gathering unit is raised and moved from its glass gathering position, the gathered glass is severed from the glass of the pool by suitable severing means and the glass in the unit may be given a preliminary form usually by the application of suitable pressure. It has been proposed to dispose a bottom plate against the lower end of the glass gathering unit after the gathering and severing operations have taken place and while the parison body and neck molds of that unit are closed to complete the glass holding cavity of the unit and to provide a support against which the preliminary blowing of the glass in the parison forming unit may take place. After the parison has been formed in this manner, the body mold of the parison forming unit usually is opened, leaving the bare parison suspended from the closed neck mold portion of the unit. A divided blow or other finishing mold may be movably supported on the same table or on an adjacent table and may be closed about the suspended parison. The neck mold portion of the parison forming unit then is opened to release the parison which may be expanded to final form in the finishing mold.

An object of the present invention is to provide improved means for and methods of steadying and supporting the parison in the manufacture of an article of glassware according to the general plan above outlined, particularly during the period of reheating which may take place between the time of beginning of opening of the parison body mold and the time when a blow mold or other finishing mold has been closed about the suspended parison.

A further object of the invention is to improve and simplify the construction and operation of mechanism, in a glass working machine of the character above described, for movably supporting the glass gathering and parison forming unit during a cycle of rotation of its supporting carrier.

Other objects and advantages of the invention will become apparent from a consideration of the following specification and of the accompanying drawings.

In carrying out the invention, I may provide a plurality of glass gathering and parison forming units, mounted on a carrier that is arranged to rotate about a vertical axis. Each of the units preferably comprises a divided parison body mold, a divided parison neck mold and a head cooperatively associated therewith and through which sub-atmospheric pressure or sub-atmospheric and positive pressures may be applied at appropriate times. Each unit is supported on the rotary carrier in such manner that it may be moved substantially vertically during the cycle of rotation of the carrier and so that it also may be projected radially outward and retracted radially inward at the proper times in the cycle of rotation of the carrier.

With supporting and operating mechanism of the general character just described, the upward and downward movement of each glass gathering unit during a cycle of rotation of the carrier may readily be controlled by a suitable cam and cam actuated mechanism while the radial movements of the unit may be controlled by suitably timed pneumatically operated mechanism on the carrier. In this manner, each unit may be lowered when it is in an outwardly projected position until the open lower end of the closed body mold of such unit is in contact with the surface of a gathering pool of molten glass. Glass from the pool then may be caused to fill the cavities of the parison body and neck mold, as by causing suction thereon or creating differential pressure at the lower end of the parison body. The unit with the glass therein is raised so as to clear the wall of the gathering pool as the rotation of the supporting carrier continues and the unit may be moved radially inward as soon as it has been raised. A suitable severing device is employed to cut off the string or neck of glass lifted from the pool as the gathering unit is raised. The gathered glass in the gathering unit may be preliminarily shaped in any suitable known manner while the parison body mold is closed about such glass. A bottom plate is brought to a supporting position beneath the lower end of the preliminarily shaped glass at the time the parison body mold begins to crack open and serves to steady and support the lower end of the preliminarily formed glass or parison, the upper end of which is suspended from the neck ring, after the parison body mold has fully opened and while the reheating of the suspended glass is taking place. Elongation and lateral distortion or deflection of such suspended preliminarily shaped glass thus are obviated or at least minimized. As the cycle of rotation of the table continues, the suspended and under supported preliminarily shaped glass will approach a transfer station, at which such glass is to be transferred to a blow or other finishing mold. Such finishing mold may be located on an adjacent rotary table and both the parison forming and supporting unit and finishing mold may be moved radially on their respective tables at the transfer station or either of them may be moved radially on its supporting table so that the parison and the finishing mold will travel together while the finishing mold is closing about such parison. Just before the parison is moved outward toward the transfer position, the bottom plate will be caused to swing away from the lower end of the suspended parison so that the finishing mold may close at the proper time about the complete pendant portion of the parison. After the transfer of the parison to the blow mold, the parison neck mold is opened to release the parison and such parison may be expanded in the blow mold into an article of finished glassware in any suitable known manner and by any suitable known means.

In the drawings:

Figure 1 is a fragmentary plan view of a portion of the improved machine, showing a glass gathering and parison forming unit thereof in position for the gathering of a charge of glass from an adjacent glass gathering pool;

Fig. 2 is a plan sectional view taken substantially along the line 2—2 of Fig. 4, but showing the parison body mold only slightly open.

Fig. 3 is a view, mainly in elevation and partly in vertical section, showing the glass gathering and parison forming unit of Fig. 1 in its glass gathering position at the gathering pool and showing a bottom support for the parison in its downwardly swung inactive position;

Fig. 4 is a view similar to Fig. 3 but showing the unit of Figs. 1 and 3 moved by the rotation of the supporting carrier toward a transfer station at which the parison formed therein is to be transferred to a finishing mold on a rotary finishing mold table, a portion of which is shown, the bottom support for the parison being shown in its active or glass supporting and steadying position; and Fig. 5 is a diagrammatic plan view of the improved machine, showing the positions of the parts on the two associated tables thereof at various stages in the operation of gathering a charge of glass from the gathering pool and forming such glass into an article of glassware.

The improved machine may comprise a rotary turret or carrier 1, shown in Figs. 1, 3 and 4 as being of substantially hub-like form and as mounted for rotation about the axis of a vertical column 2. Any suitable means for causing rotation of the carrier 1 may be employed. A worm wheel 3 is shown in Figs. 3 and 4 as having been applied to the lower end portion of the carrier and as being adapted for actuation by a suitable worm, not shown. A plurality of glass gathering and parison forming units, each indicated at A, are mounted on the carrier 1. The description of one of such units will suffice as a description of each of the others.

Each unit A preferably comprises a substantially right angular vertically movable frame or bracket member 4 having a vertically disposed member 4a of substantially channel-like formation, Fig. 2, connected at its upper and lower ends by the vertically spaced parallel pairs of parallel links 5 and 6 with vertically spaced pairs of outwardly projecting lugs or ears 7 and 8, respectively, on the rotary turret or carrier. As clearly shown, Figs. 1, 3 and 4, horizontal pivot pins 9 and 10, respectively, connect the inner ends of the pairs of links 5 and 6 with the outwardly projecting pairs of ears 7 and 8, respectively, while horizontal pivot pins 11 and 12 connect the outer ends of the pairs of links 5 and 6 with the upper and lower ends, respectively, of the vertical member 4a of the bracket or frame 4. The other member of the right angular bracket 4 is indicated at 4b and extends in a substantially radially outward direction with respect to the axis of rotation of the carrier 1. The member 4b of the bracket 4 has a substantially flat horizontal supporting surface 13, Figs. 1 and 2, on which the base of a radially movable slide member 14 is disposed, a guideway being provided at 15 in which the base of the member 14 may slide and retaining strips 16 being secured to the member 4b at the sides of the guideway to prevent accidental displacement of the slide member 14. As seen in Fig. 2, the base of the slide member 14 comprises a pair of transversely spaced substantially flat side portions 14a connected at their inner edges by an upstanding frame structure having side members 17 and a transversely extending rear member 18. A portion 19 of the frame structure of this slide member carries a vertical pivot pin 20 on which are pivotally supported the arms of holders 21 for the halves 22 of a divided parison body mold. A bracket 23 on the frame structure of the slide member or an extension thereof carries a vertical pivot element 24 on which are mounted the arms of the holders 25 for the halves 26 of a two-part parison neck mold or ring. Another bracket 27 on the frame of the radially movable slide member or an extension thereof has an arm 28 on which a head 29 is supported. The head 29 may be adapted to apply sub-atmospheric and super-atmospheric pressures at different times and the head 29, the parison neck mold and parison body mold are relatively disposed so that the neck mold and the parison body mold when closed will cooperate to form a unitary glass receiving member and the head will be disposed in substantially fluid tight contact with the neck mold.

Any suitable known means may be employed to open and close the parison body mold and the parison neck mold at the proper times in the cycle of rotation of the carrier 1. The drawings show a pneumatic cylinder 30 mounted on the frame work of the slide member and arranged to actuate, through suitable intermediate motion transmitting connections generally indicated at 31, a pair of vertically reciprocable pins 32, Fig. 1, each of which is provided with spiral screw threads in mesh, as at 33, Fig. 4, with internal spiral screw threads on a rock sleeve 35.

The latter is suitably connected, as by means of the rocker arm 36 and the link 37, with the arm of the corresponding holder 21 for one of the halves of the parison body mold, whereby the upward movement of the pins 32 as the piston moves upward in the cylinder 30 to the position shown in Fig. 3 will close the halves of the parison body mold while the downward movement of the pins 32 as the piston moves downward in the cylinder 30 will open the halves of the parison body mold. A construction similar to the parison body opening and closing mechanism shown in the accompanying drawings also is disclosed in my prior copending application, Serial No. 338,932, filed Feb. 11, 1929 and is described in greater detail therein. In the present parison body opening and closing mechanism, a spring 30—a in the top of the cylinder 30, Fig. 3, may cause a slight downward movement of the piston and of the pins 32 to effect a slight opening movement or "cracking" open of the parison body mold when pressure below the piston has been relieved. The application of pressure above the cylinder to fully open the halves of the parison body mold may be initiated at an adjustable time in the cycle of rotation of the carrier 1 after the "cracking" of such parison body mold.

The mechanism for opening the halves of the neck mold may comprise a vertically reciprocable pin 38 having a tapering lower end 39 adapted when the pin is moved downward from the position shown in Fig. 4 to be wedged between a pair of upstanding lugs, one of which is indicated at 40, on the arms of the holders of the halves of the neck ring, whereby the neck ring will be opened. The vertical reciprocations of the pins 38 may be effected by the operations of a piston in a horizontal cylinder 41, shown in Figs. 3 and 4 as being mounted on the bracket 27, such piston being connected by suitable intermediate motion transmitting mechanism, generally indicated at 42, with the upper end portion of the pin 38, whereby movement of the piston in one direction in the cylinder 41 will raise the pin 38 to the position shown in Fig. 4 while movement of the piston in the opposite direction in the cylinder 41 will cause downward movement of the pin 38, and consequent opening of the halves of the neck mold as hereinbefore described. A more complete description of substantially the same neck mold opening mechanism may be found in my aforesaid copending application, Serial No. 338,932.

The halves of the neck mold may be closed in any suitable known manner, as by a spring, not shown, or the arrangement may be such that the closing of the halves of the parison body mold will also cause closing of the halves of the neck mold, suitable contact members being provided on the adjacent portions of the halves of the parison body and neck molds to effect this result.

The parison body and neck molds, the suction or combined suction and blow head above the neck mold, and the parison body and parison neck mold operating mechanisms thus are all mounted on the radially slidable member 14 which in turn is mounted on the member 4b so as to be capable of limited radially inward and outward movements. The radial movements of the slide member 14 and the parts carried thereby may be controlled by pneumatically operated mechanism comprising a cylinder 43 which is illustrated as being disposed inwardly of the upstanding bracket member 4a, being secured to the latter by the fastening means 44 or in any other suitable manner. A piston 45, Fig. 2, is reciprocable in the cylinder 43 and has a rod 46 extending radially outward through a reduced head portion 47 of the cylinder, which head portion in turn extends through an opening 48 in the web of the upstanding member 4a. The piston rod 46 is suitably connected, as by its screw threaded extension 49 and a nut 50, with the rear portion 18 of the frame structure of the slide member 14, whereby when the piston 45 is moved to the left from the position shown in Fig. 2, the slide member 14 and all the parts carried thereby will be projected radially outward toward the position shown in Fig. 3. When the piston 45 is at the inner end of the cylinder 43, as shown in Fig. 2, the slide member 14 and all the parts carried thereby will be retracted inwardly toward the axis of rotation of the carrier 1.

The vertical movements of the bracket 4 and the parts carried thereon are controlled by a cam 51 which is shown in Fig. 5 as extending completely around the column 2. The bracket 4 has a depending lug 52. An arm 53 is adapted to slide against the face of the lug 52 and is provided with a vertical slot through which a plurality of tap bolts 55 extend and engage threaded openings in the lug 52. The arrangement is such that the tightening of the tap bolts 55 will secure the arm 53 firmly, although releasably, to the lug 52. A depending vertically adjustable screw 56 is threaded into the horizontal member of the bracket 4 and depends from the latter in the path of vertical movement of the upper end of the arm 53 and thus serves as an adjustable stop for limiting the extent of adjustment of the latter toward the bracket.

The arm 53 carries a roll 57 which rides on the cam 51, the latter being suitably laid out to cause the bracket 4 to be raised and lowered at the proper times in the cycle of rotation of the carrier 1. The plural pairs of links 5 and 6 will guide the vertical movements of the bracket 4 in such manner that the parts thereon will be maintained horizontal at all times. The upper and lower limits of the vertical movements of the bracket 4 may be adjusted within limits without replacing the cam 51 by adjusting the effective length of the arm 53, this being effected by loosening the tap bolts 55 and adjusting the stop screw 56 until the effective length of the arm 53 has been adjusted as desired and then tightening the tap bolts 55 to maintain such adjustment.

The member 4a of the vertically movable bracket and the lower portion of the slide member 14 are provided with vertically registering slots 58 and 59, respectively, Fig. 2, extending in a generally radial outward direction from a pair of transversely spaced upstanding ears 60 on the member 4a. A horizontal pivot element 61 is carried by the ears 60 and supports an arm 62. A parison bottom supporting plate 63 is carried on the outer end of the arm 62, as by means of a screw 63a which is threaded through the outer end portion of the arm 62 and is provided at its lower end with a hand wheel 64, whereby the plate 63 may be adjusted in a direction at right angles with the direction of length of the arm 62. This arm 62 may swing upwardly from the downwardly and outwardly inclined position shown in Fig. 3 into the registering slots 58 and 59 until the plate 63 is substantially horizontal and is disposed at a predetermined level for a purpose to be presently described. The rear wall 18 of the frame structure on the slide member 14 may be undercut, as indicated at 65 in Figs. 2 and 3 to clear the ears 60 and the adjacent portion of the pivotally mounted arm 62 when the slide member 14 is in its outwardly projected position as shown in Fig. 3.

The arm 62 is periodically raised from the position shown in Fig. 3 by mechanism which may comprise a bent or angular lever 66 which also may be pivoted on the pivot element 61. The lever 66 carries a cam roll 67. An out-turned lug 68 on the lever 66 is provided with a slot through which protrudes a pin 69 that is carried by the arm 62. An adjustable stop member, such as the nut 70 on the end of the pin 69, limits the relative swinging movements of the lever 66 and the arm 62 apart while an expansion spring 72 between the lug 68 and the arm 62 tends to force the arm 62 and the lever 66 in opposite directions about the axis of the pivotal element 61. Gravity will tend to swing the pivoted members 66 and 62 and their intermediate connecting mechanism in a downward direction from the position shown in Fig. 4 toward the position shown in Fig. 3, at which time an adjustable stop 73 on the lever 66 will strike a fixed abutment 74 on the adjacent portion of the bracket member 4a. The upward swinging movement of the lever 66 and the arm 62 will take place when the cam roll 67 moves up an inclined end portion 75 of a cam track. The movement of the cam roll on the cam track directly actuates the lever 66 and the latter in turn actuates the arm 62 through the resilient connection 72 so that the arm 62 will be swung upwardly substantially to the horizontal position shown in Fig. 4, in which position the plate 63 thereon may support and steady the lower end of a parison 76, such as is shown in Fig. 4 as being suspended from the closed parison neck mold. The bottom plate 63 will remain in its raised position while the cam roll 67 travels along a portion 77 of the cam track that is concentric with the axis of rotation of the carrier 1. When the cam roll moves down the inclined portion 78 of the cam track, the pivoted plate supporting mechanism will be free to move downward by gravity until the adjustable stop 73 strikes the abutment 74. It will be apparent that the bottom plate 63 and its supporting arm will be cushioned on their downward movement by the spring 72 and that the movement of the plate 63 against the lower end of the pendant parison will be effected by resilient means so that if any obstruction should be encountered, the bottom plate supporting arm will yield without being broken or without causing damage to any adjacent part.

A cycle of operations of a machine comprising the hereinbefore described parts may be substantially as follows: Starting with the glass gathering and parison forming unit in an outwardly projected lowered position with the lower end of the parison body mold in contact with the glass of the gathering pool 79, as shown in Fig. 3, suction may be applied through the head 29 to draw molten glass from the pool into the cavity of the closed neck mold and parison body. As the rotation of the table continues in the direction of the arrow in Fig. 5, which is a clock-wise direction, the charged parison forming unit is raised, a severing member 80 may be projected across the top wall of the pool by pneumatic operating mechanism 81 to position to wipe across the lower end of the charged parison body mold and to sever the gathered glass from the glass of the pool. During these glass gathering and glass severing operations, the bottom plate 63 is in its downwardly swung inactive position, as shown in Fig. 3. The rotation of the carrier 1 moves the raised glass parison and forming unit toward the position indicated at L, in Fig. 5. During the travel of the unit from the glass gathering position toward the position L, the piston in the cylinder 43 may be actuated to effect movement of the parison forming unit radially inward. The suction within the unit may be discontinued and blowing pressure may be applied to partially expand the glass or in other words to give it a preliminary shape. The parison body mold will remain closed during this preliminary shaping of the glass and the bottom plate will remain in its downwardly swung inactive position. When the unit reaches the position indicated at L in Fig. 5, the halves of the parison body mold may crack open and as such opening of the parison body mold begins, the movement of the cam roller 67 along the inclined portion 75 of the cam track may cause the bottom plate 63 to be swung upwardly to position to support and steady the lower end of the preliminarily formed glass or parison, which is still held by the closed neck mold and depends through the partially open halves of the parison body mold. As the rotation of the carrier 1 continues, the plate 63 remains in its active position and supports and steadies the lower end of the pendant parison, preventing or minimizing elongation and lateral distortion or deflection of the glass during a reheating period, until the unit reaches the position indicated at M in Fig. 5. This is just before the parison is moved to a position for the transfer thereof to a blow mold, generally indicated at 82, on an associate rotary blow mold table 83. At the time the unit reaches the position M, the parison body mold halves are open, as shown, and immediately after passing the position M, the slide member 14 may be projected outwardly while the roll 67 moves down the portion 78 of the cam track and permits the bottom plate 63 to move away from the glass parison. The table 83, carrying the blow or finishing molds and their operating mechanism is rotating in synchronism with the table 1 but in the opposite direction. Each blow mold 82 may comprise cooperative halves carried by holders which are pivoted, as at 84, Fig. 5, on a radially movable slide plate 85 on the rotary table 83. Suitable pneumatically operated mechanism, generally indicated at 86, may be provided for opening and closing the halves of the finishing mold 82 at the proper times in the cycle of rotation of the table 83. The radial movement of the slide plate 85 and of the parts carried thereby may be under the control of a suitably laid out closed cam track 87 in which a roll 88 for actuating the plate 85 travels. The roll 88 has a suitable motion transmitting connection 89 with the plate 85, such connection extending through a slot 90 in the table 83. With this arrangement, the blow mold may be moved radially as the blow mold halves are closed about the suspended parison, this radial movement of the blow mold being suitably predetermined with relation to the movement of the corresponding parison forming unit so that the parison and the blow mold will travel in unison during the closing of the halves of the blow mold. The specific construction of the blow mold supporting and operating mechanism may be substantially as disclosed in my copending prior application, Serial No. 323,954, filed December 5, 1928. The parison unit may be projected to its outermost position after leaving the position M and may remain in such outwardly projected position during the transfer, the radial movement of the blow mold being sufficient to permit the transfer while the parison and blow mold travel together, or radial movements of the parison unit may be caused to take place during the transfer to supplement the radial movement of the blow mold for effecting desirable coincidence of travel of the parison and blow mold during the transfer. After the blow mold has been closed about the parison, the neck mold will be opened and the parison of course will travel in the closed blow mold and may be formed in the latter into an article of glassware in any suitable known manner and by any suitable known means.

After the transfer, the parison forming unit may remain in its outwardly projected position during its travel past the position N, in Fig. 5, the parison body and parison neck molds both being open to permit cooling thereof. After passing the position N, the parison body and neck molds will be closed, as by the time the unit reaches the position indicated at O, in Fig. 5, in which position the unit is raised for travel above the gathering pool and is passing the adjacent wall of the gathering pool. After passing the position O in Fig. 5, the glass gathering and parison forming unit will be lowered into contact with the pool, as shown in Fig. 3, and a new cycle of operations of the glass gathering and parison forming unit will be initiated.

In the meantime, the parison in the closed blow mold has been moved by the rotation of the table 83 successively past the positions indicated at P, Q and R, after which the continued rotation of the table 83 will bring the article of glassware to a takeout position indicated by the dotted line position at T, the blow mold being then opened to permit the removal of the article and remaining open for cooling past the position U. The halves of the blow mold then will be again closed about another parison to effect the transfer of the latter in the manner hereinbefore described.

Suitable valves (not shown) may be provided for controlling the passage of pressure to and/or from the pneumatic cylinders and pressure applying heads of the machine. The timing of the operations of such valves may be controlled in any suitable known manner and by any suitable means, which may include cam mechanism such as that partially shown at 91 in Figs. 3 and 4. Since neither the valves nor their operating and timing mechanism per se form any part of the present invention but may be of any suitable known construction, they have not been illustrated in the accompanying drawings and need not be further described herein.

The foregoing description contemplates the charging of the parison forming units with glass by the suction method but it is obvious that the principles of the invention may be applied to a machine in which the parison forming units are to be supplied with glass charges by hand feeding or by a suitable automatic feeder of known construction. Thus, the parison body mold and/or the neck mold of each unit may be adapted to be inverted periodically to permit a mold charge to be dropped into the inverted parison mold. The charge then may be compacted in the neck mold and parison body mold and a cavity may be formed in the neck portion of the glass, either by having the glass drawn up around a downwardly projecting plunger, by forcing a plunger into the glass, by blowing or by a combination of these means.

Other modifications and adaptations of the hereinbefore described practical embodiment of the invention may be provided without departing from the spirit and scope of the invention, as set forth in the appended claims.

1. In a glass forming machine, an open bottomed glass gathering unit supported for rotation about a vertical axis from a gathering position to a transfer position, a bottom plate mounted to travel with said unit about said vertical axis and also mounted to swing about a horizontal axis to and from a glass supporting position at the lower end of said unit, and means for moving said pivoted bottom plate to and from its said glass supporting position between said positions of said unit during each cycle of rotation of said unit about said vertical axis, to engage the bottom of, and to support a bare parison in, said unit.

2. In a glass forming machine, a carrier mounted to rotate about a vertical axis, a glass gathering unit mounted for travel with said carrier about said vertical axis and for radial rectilinear movement with respect to said vertical axis, the rotation of the carrier moving the unit from a gathering position to a transfer position, a bottom plate associated with said unit and supported for movement with said carrier about said vertical axis and for movement independently of the carrier to and from a position at the lower end of said unit to engage the bottom of, and to support, an exposed parison in said unit when said unit is at the inner end of its path of radial movement, and cam actuated means for moving said bottom plate to and from its said glass supporting position between the gathering and transfer positions of said unit.

3. In a glass forming machine, a carrier adapted to rotate about a vertical axis, a glass gathering unit mounted for travel with said carrier about said vertical axis, said unit comprising a neck mold and a sectional parison body mold, means for opening said parison body mold at a given time in the cycle of rotation of said carrier to leave a parison in such unit suspended from the neck mold, a pivotally supported bottom plate out of alignment with said unit when said parison body mold is closed, means for moving said bottom plate into position to support and steady the lower end of the suspended parison when said parison body mold has been opened, a blow mold, means for transferring the parison to the blow mold, and means for disengaging the bottom plate and parison prior to transferring the parison to the blow mold.

4. In a glass forming machine, a carrier mounted to rotate about a vertical axis, a frame connected to travel with said carrier about said vertical axis and adapted also to move vertically independently of the carrier, a glass gathering unit supported on said frame for movement with the latter and for radial rectilinear movement with respect to the axis of rotation of the carrier independently of said frame, means for at least partially exposing a suspended parison in said unit, means for removing the parison from said unit, a bottom plate pivotally supported on said frame for swinging movement to and from a glass supporting position at the lower end of said unit when said unit is at the inner end of its path of radial movement, and means for timing the movements of said bottom plate to and from its said glass supporting position in the interval between the partial exposure of said parison and the removal thereof from said unit.

5. In a glass forming machine, a carrier mounted to rotate about a vertical axis, a frame connected to travel with said carrier about said vertical axis and adapted to move vertically independently of the carrier, a radially slidable member carried by said frame, an open bottomed glass gathering unit carried by said radially slidable member, a bottom plate, an arm carrying said bottom plate and pivotally supported on said frame to swing about a horizontal axis to and from position to dispose said bottom plate in glass supporting position beneath said glass gathering unit when said radially slidable member is at the inner end of its path of radial movement, and cam actuated means controlling the swinging movements of said pivoted arm to move said bottom plate to and from its glass supporting position during each cycle of rotation of said carrier.

6. In a glass forming machine, a carrier mounted to rotate about a vertical axis, a frame connected to travel with said carrier about said vertical axis and adapted to move vertically independently of the carrier, a radially slidable member carried by said frame, an open bottomed glass gathering unit carried by said radially slidable member, a bottom plate, an arm carrying said bottom plate and pivotally supported on said frame to swing about a horizontal axis to and from position to dispose said bottom plate in glass supporting position beneath said glass gathering unit when said radially slidable member is at the inner end of its path of radial movement, said bottom plate being adjustably supported on said arm, and cam actuated means controlling the swinging movements of said pivoted arm to move said bottom plate to and from its glass supporting position during each cycle of rotation of said carrier, said cam actuated means comprising a lever, a cam roll carried by the lever, and motion transmitting means including a resilient member connecting said lever with said pivoted bottom plate supporting arm.

7. In a glass forming machine, an open bottomed glass gathering unit comprising a neck mold and a sectional body mold, rotary means for supporting and moving said unit to cause the unit to dip periodically to position to gather glass from a gathering pool, means for opening the sections of said body mold at a predetermined time after the gathering operation to leave the gathered glass suspended from the neck mold, means for removing the parison from said unit, a bottom plate movable after the beginning of opening of said body mold to position to contact with the bottom end of the suspended glass to support and steady such glass, a pivoted arm for supporting said bottom plate, means yieldingly connected to said arm for swinging said bottom plate, and means arranged to actuate the last-named means to move the bottom plate into engagement with the bottom of the parison and out of engagement therewith prior to the removal of the parison from said unit.

8. In a glass forming machine, an open bottomed glass gathering unit comprising a neck mold and a sectional body mold, means for supporting and moving said unit in a closed path to cause the unit to dip periodically to position to gather glass from the gathering pool, means for partially opening the sections of said body mold at a predetermined time after the gathering operation to leave the gathered glass suspended from the neck mold but enclosed by the body mold, a bottom plate movable after the beginning of opening of said body mold to position to contact with the lower end of the suspended glass to support and steady such glass and subsequently movable out of such glass contacting position, means for so moving the bottom plate, a sectional blow mold supported for movement in a closed path different from that of said glass gathering unit, and means controlling the movements of said blow mold to cause it to close about the suspended parison, the means for moving the bottom plate including means for disengaging it from the parison prior to the enclosure thereof in the blow mold.

9. In a glass forming machine, a carrier mounted to rotate about a vertical axis, a frame permanently mounted radially of the axis of the carrier for travel with said carrier about said vertical axis and for movement independently of the carrier in a vertical plane, a glass gathering unit including a neck mold and body mold mounted on said frame for travel with the latter about the axis of rotation of the carrier and in said vertical plane and for independent movement rectilinearly and radially of the axis of the carrier on the frame, means for constantly holding said unit in upright position on said frame, means for controlling the vertical movements of said frame during each cycle of rotation of the carrier and other means for controlling the radial movements of said glass gathering unit.

10. In a glass forming machine, a carrier mounted to rotate about a vertical axis, a frame mounted for travel with said carrier about said vertical axis and for movement independently of the carrier in a vertical plane, a glass gathering unit mounted on said frame for travel with the unit about the axis of rotation of the carrier and in said vertical plane and for independent rectilinear movement on the frame, cam actuated means for moving said frame vertically during each cycle of rotation of the carrier, said cam actuated means being adjustable to vary the path of vertical movement of the frame, and pneumatic means for controlling the rectilinear movements of said unit on said frame.

11. In combination with the parison mold of a glassware forming machine, in which a parison is shaped, a support for engaging the bottom of said parison, an arm mounted on a horizontal pivot for carrying said support, said support being adjustable relative to said arm, means for swinging said arm to move the support into and out of engagement with the bottom of the parison, and a yielding connection between said arm and said oscillating means.

12. In a glass forming machine, a carrier mounted to rotate about a vertical axis, a frame, parallel links for pivotally connecting said frame to said carrier, whereby said frame will travel with the carrier about said vertical axis and may move vertically independently of the carrier, a vertically extending cam member encircling the carrier, a cam roller carried by said frame and constantly engaging the top edge of said cam member, whereby rotation of the carrier relative to the cam will cause vertical movement of the frame member, glass gathering and parison forming means carried by said frame, a bottom support associated with said gathering and forming means, a cam of generally circular shape exterior of said first-named cam member, and means connected to said bottom support and engaging said second-named cam member for moving said support into and out of operative position.

KARL E. PEILER.